(12) United States Patent
Ho et al.

(10) Patent No.: US 11,858,354 B2
(45) Date of Patent: Jan. 2, 2024

(54) EMERGENCY DISCONNECT CIRCUIT FOR HIGH-VOLTAGE BATTERY ELECTRIC SYSTEM AND MOTOR VEHICLE HAVING THE SAME

(71) Applicant: GM GLOBAL TECHNOLOGY OPERATIONS LLC, Detroit, MI (US)

(72) Inventors: Li-Pen John Ho, Farmington Hills, MI (US); Calvin Goodman, Auburn Hills, MI (US); Rajesh Nagappala, Lake Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 151 days.

(21) Appl. No.: 17/717,286

(22) Filed: Apr. 11, 2022

(65) Prior Publication Data

US 2023/0322088 A1   Oct. 12, 2023

(51) Int. Cl.
*B60L 3/04*      (2006.01)
*B60L 3/00*      (2019.01)
*H02J 7/00*      (2006.01)
*H02H 7/18*      (2006.01)
*H01H 39/00*     (2006.01)

(52) U.S. Cl.
CPC ............... *B60L 3/04* (2013.01); *B60L 3/0046* (2013.01); *H01H 39/006* (2013.01); *H02H 7/18* (2013.01); *H02J 7/0031* (2013.01); *H01H 2039/008* (2013.01)

(58) Field of Classification Search
CPC ....... B60L 3/04; B60L 3/0046; H01H 39/006; H01H 2039/008; H02H 7/18; H02J 7/0031
See application file for complete search history.

(56) References Cited

U.S. PATENT DOCUMENTS 9,221,343 B2 * 12/2015 Tokarz ................... B60L 58/10

FOREIGN PATENT DOCUMENTS

CN   109641528 A  *  4/2019  ............ B60L 3/0007
WO  WO-2015117755 A1 *  8/2015  ............ B60K 28/14

OTHER PUBLICATIONS

Machine translation of WO-2015117755-A1, Aug. 2015, Birner, M.*

* cited by examiner

*Primary Examiner* — Jared Fureman
*Assistant Examiner* — Duc M Pham
(74) *Attorney, Agent, or Firm* — Quinn IP Law

(57) ABSTRACT

An emergency disconnect circuit for use with a high-voltage (HV) bus of a battery electric system, e.g., aboard a mobile system, includes a pyrotechnic switch and a manual switch. The pyrotechnic switch configured irreversibly opens in response to an electronic triggering signal to disconnect an HV battery pack from the HV bus in a first manner. The manual switch is arranged on a low-voltage (LV) bus in series with and between the pyrotechnic switch and an LV power supply. Transition of the manual switch from an open position to a closed position connects the LV power supply to the pyrotechnic switch. This causes the LV power supply to discharge the triggering signal to the pyrotechnic switch. When used aboard a mobile system, an electronic monitoring unit generates the triggering signal in a second manner in response to a threshold impact event.

20 Claims, 2 Drawing Sheets

EMERGENCY DISCONNECT CIRCUIT FOR HIGH-VOLTAGE BATTERY ELECTRIC SYSTEM AND MOTOR VEHICLE HAVING THE SAME

INTRODUCTION

Multi-cell batteries are commonly used as direct current power supplies aboard a wide range of battery electric systems. In an electric vehicle, for instance, a propulsion battery pack having an application-suitable number of cylindrical, prismatic, or pouch-style battery cells may be connected to a high-voltage electrical load. The collective HV electrical load may include one or more polyphase/alternating current electric traction motors, an intervening power inverter module, and a voltage converter, with the latter also referred to in the art as an auxiliary power module. Low-voltage components such as a 12-volt lead acid battery in turn are connected to an auxiliary voltage bus on one side of the voltage converter. The various high-voltage components are likewise connected to the voltage converter on a separate high-voltage bus side thereof.

Pure electric vehicles, hybrid electric vehicles, and other mobile systems having an electrified powertrain may be equipped with one or more fast-acting pyrotechnic switches, which instantly open in an irreversible manner in response to an electronic triggering signal. To that end, a mobile system may be equipped with sensors configured to output the electronic triggering signal, typically as a current or voltage signal. This action occurs in response to detection of conditions indicative of threshold collision/impact forces, e.g., measured accelerations, decelerations, and/or g-forces. Strategic positioning of one or more pyrotechnic switches within the circuitry of the propulsion battery pack is therefore intended to help ensure that the battery pack quickly disconnects from the high-voltage bus in response to events exceeding predefined acceleration/deceleration limits.

SUMMARY

Disclosed herein is an emergency disconnect circuit for use with a high-voltage (HV) battery electric system, e.g., of a pure electric vehicle, hybrid electric vehicle, robot, or another mobile system as exemplified herein. The emergency disconnect circuit as contemplated herein provides a manual solution for ensuring that an HV propulsion battery pack of the battery electric system has been fully disconnected from the HV bus after a threshold impact event. As appreciated in the art, motor vehicles having modern constructions are typically equipped with several deployable air bags. Using sensory input from impact detection of sensor-based collision monitoring sensors similar to those used for determining precisely when to inflate the air bags, pyrotechnic switches arranged in the aforementioned propulsion battery pack may be automatically triggered to quickly sever a conductive path between the battery pack and the HV bus.

Benefits of the contemplated emergency disconnect circuit may be realized in an exemplary use scenario involving a team of first responders. During certain vehicle events, impact forces acting on the vehicle may be registered by a suite of sensors of an associated electronic monitoring unit (EMU) of an onboard control system, with the EMU in turn triggering the pyrotechnic switch(es) as noted above. When the EMU functions as programmed and intended, the propulsion battery pack is rapidly disconnected from the HV bus. The present hardware solution adds manual control to the typical EMU-pyrotechnic switch function, and thus enables first responders in this exemplary use case to ensure that the battery pack has indeed been severed from the HV bus as expected.

To this end, the emergency disconnect circuit includes a manual switch placed in series between a low-voltage (LV) power supply and the pyrotechnic switch, with the LV power supply possibly including an auxiliary/12-volt battery, a capacitor, and/or an external battery in various implementations. The manual switch is positioned at an accessible location to provide a mechanism for manually triggering the pyrotechnic switch, or as a backup approach for ensuring that the EMU has accomplished this task. Likewise, under conditions in which the EMU would not otherwise be expected to trigger the pyrotechnic switch, the emergency disconnect circuit still provides a mechanism by which a first responder, a second responder, or a salvage operator may elect to disconnect the HV battery pack as an added precaution before performing various actions.

In particular, an aspect of the disclosure includes the emergency disconnect circuit for a battery electric system having an HV battery pack connected to an HV bus, an LV power supply connected to an LV bus. The emergency disconnect circuit according to an exemplary embodiment includes a pyrotechnic switch and a manual switch. The pyrotechnic switch is configured to open in response to an electronic triggering signal to thereby disconnect the HV battery pack from the HV bus. The manual switch is arranged on the LV bus in series with and between the pyrotechnic switch and the LV power supply. A transition of the manual switch from an open position to a closed position connects the LV power supply to the pyrotechnic switch, and thereby causes the LV power supply to discharge the electronic triggering signal to the pyrotechnic switch.

A diode in some configurations is disposed between the LV power supply and the manual switch.

The LV power supply may include a 12-volt auxiliary battery of a mobile system, with the HV battery pack being a propulsion battery pack of the mobile system. In such an implementation, the emergency disconnect circuit includes an EMU operable for detecting a threshold impact event of the mobile system, and for transmitting the electronic triggering signal to the pyrotechnic switch in response to the threshold impact event. A capacitor may be positioned in parallel with the 12-volt auxiliary battery, wherein the capacitor is operable for discharging the electronic triggering signal to the pyrotechnic switch when the manual switch is in the closed position.

The emergency disconnect circuit in some configurations is configured to connect to an external battery. The external battery is operable for discharging the electronic triggering signal to the pyrotechnic switch when the manual switch is in the closed position.

A battery electric system is also disclosed herein for use aboard a mobile system. In a possible construction, the battery electric system includes an LV power supply, an HV bus, and an HV battery pack connected to the HV bus. The HV battery pack includes the pyrotechnic switch, which in turn is configured to open in response to an electronic triggering signal to thereby disconnect the HV battery pack from the HV bus. The battery electric system also includes an emergency disconnect circuit connected to the pyrotechnic switch and including a manual switch. The manual switch is connected in series with and between the pyrotechnic switch and the LV power supply, and is configured, when transitioned from an open position to a closed position, to discharge the electronic triggering signal to the pyrotechnic switch. The battery electric system in this embodiment includes an EMU operable for transmitting the electronic triggering signal to the pyrotechnic switch in response to detecting a threshold impact event of the mobile system, wherein the pyrotechnic switch is configured to open in response to the electronic triggering signal to thereby disconnect the HV battery pack from the HV bus.

A motor vehicle is also described herein. A representative embodiment of the motor vehicle includes a vehicle body, a 12-volt battery positioned on an LV bus, and an HV propulsion battery pack positioned on an HV bus. The HV propulsion battery pack includes a pyrotechnic switch configured to activate in response to an electronic triggering signal to thereby disconnect the HV battery pack from the HV bus. An emergency disconnect circuit is connected to the pyrotechnic switch, and includes a manual switch situated on the LV bus in series with and between the pyrotechnic switch and the 12-volt battery. The manual switch, when transitioned from an open position to a closed position, connects the 12-volt battery to the pyrotechnic switch and thereby causes the 12-volt battery to discharge the electronic triggering signal to the pyrotechnic switch.

The EMU in this configuration is operable for generating the electronic triggering signal in response to a threshold impact event of the motor vehicle, with the EMU including a plurality of inertial sensors configured to detect a threshold impact event of the vehicle body, and to transmit the electronic triggering signal to the pyrotechnic switch in response to the threshold impact event.

The above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes combinations and sub-combinations of the elements and features presented above and below.

BRIEF DESCRIPTION OF THE DRAWINGS

The accompanying drawings, which are incorporated into and constitute a part of this specification, illustrate implementations of the disclosure and together with the description, serve to explain the principles of the disclosure.

Figure 1:
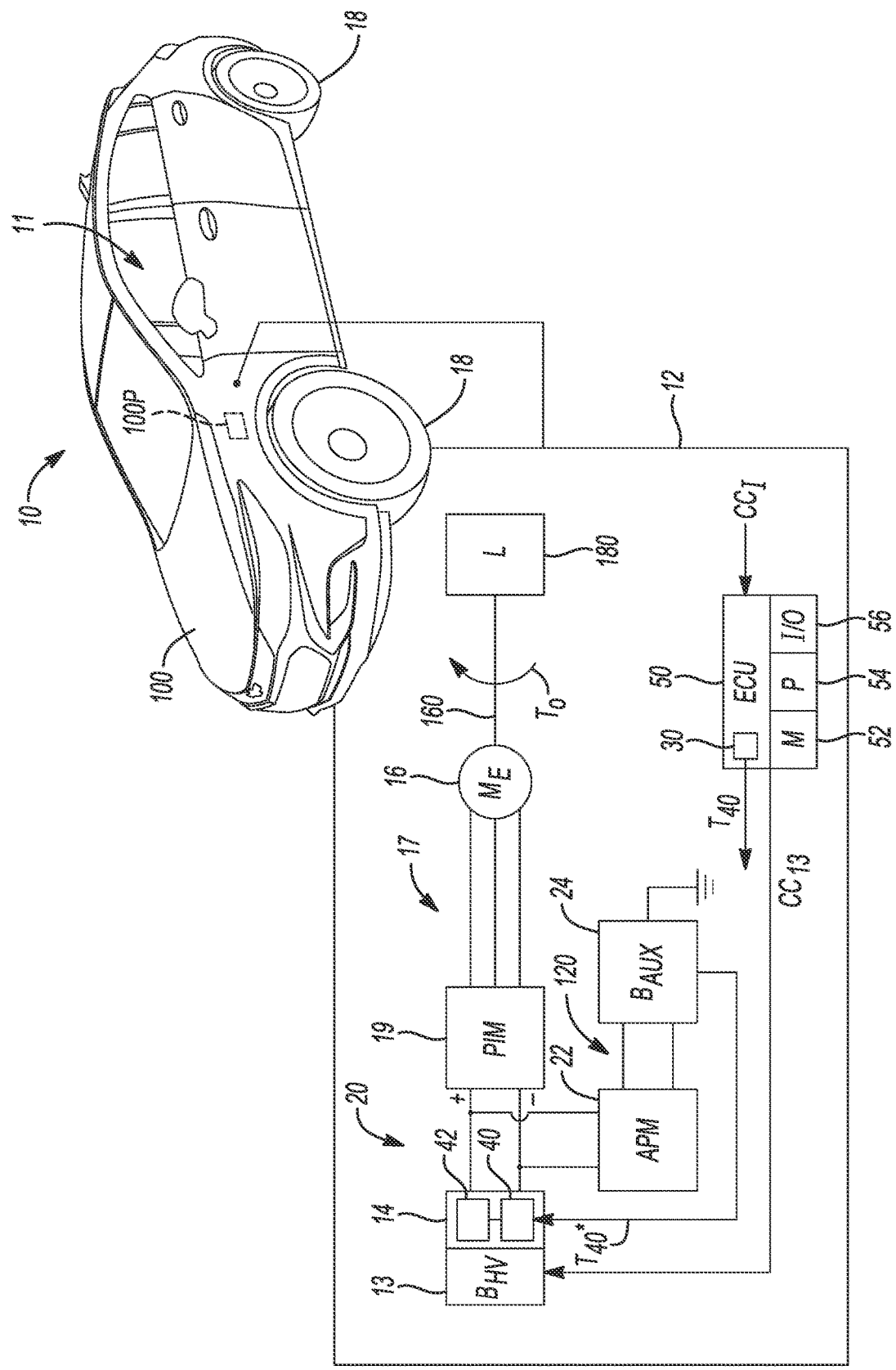
FIG. 1 is an exemplary motor vehicle having a battery electric system equipped with a high-voltage (HV) battery pack and an emergency disconnect circuit constructed as set forth herein.

The appended drawings are not necessarily to scale, and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, and the words "including", "containing", "comprising", "having", and the like shall mean "including without limitation". Moreover, words of approximation such as "about", "almost", "substantially", "generally", "approximately", etc., may be used herein in the sense of "at, near, or nearly at", or "within 0-5% of", or "within acceptable manufacturing tolerances", or logical combinations thereof.

As used herein, a component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

Figure 2:
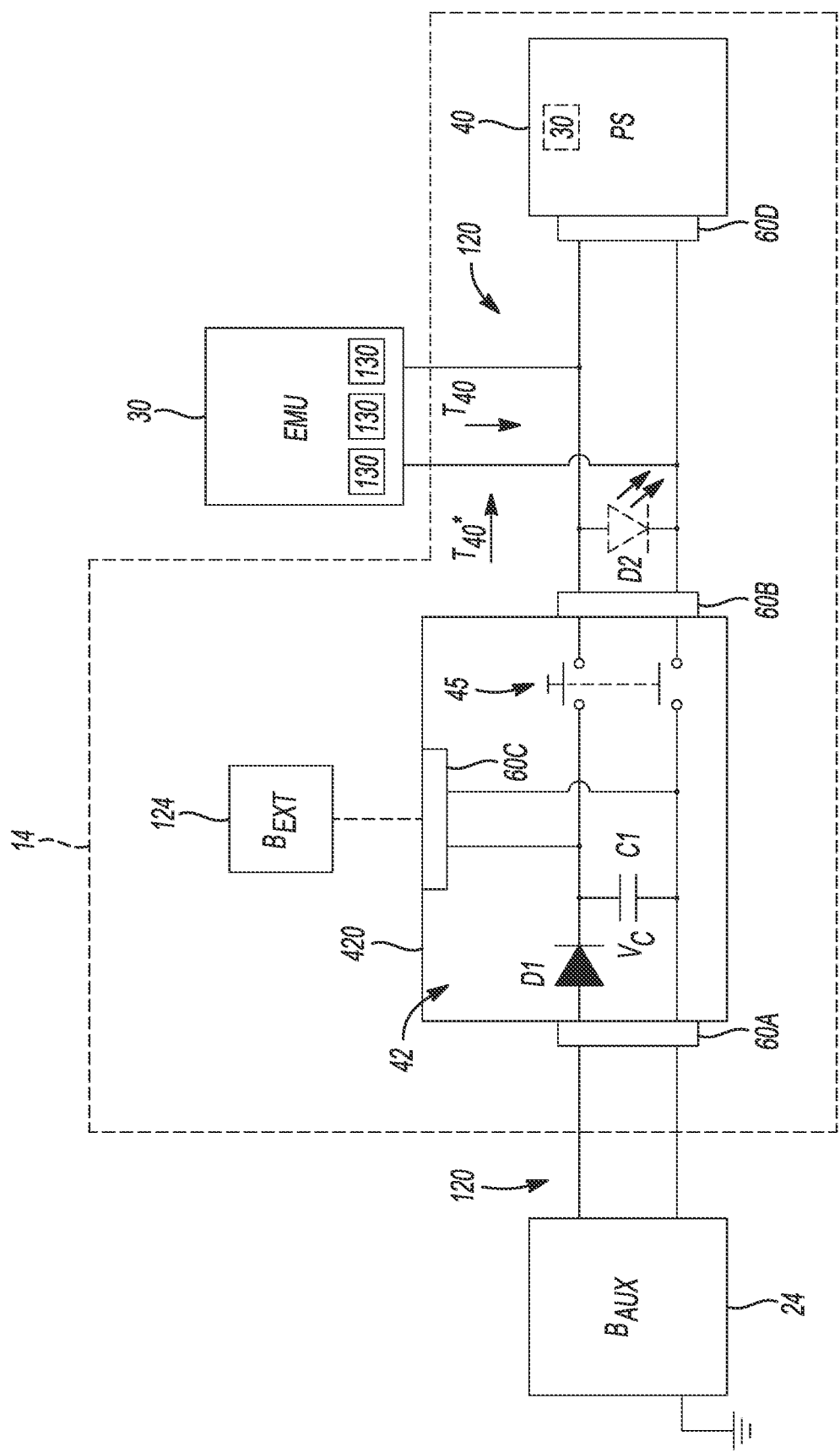
FIG. 2 is a schematic illustration of an exemplary circuit topology for implementing the present teachings aboard a battery electric such as the motor vehicle of FIG. 1.

Referring to the drawings, wherein like reference numbers refer to like features throughout the several views, FIG. 1 depicts a mobile system 10 having a battery electric system 12. The battery electric system 12 in turn includes a high-voltage (HV) battery pack ($B_{HV}$) 13, such as one or more lithium-ion battery packs, or packs constructed another application suitable high-energy battery chemistry. The HV battery pack 13 is equipped with an emergency disconnect circuit 14, a representative embodiment of which is shown in FIG. 2. The emergency disconnect circuit 14 as described in detail herein is configured to rapidly disconnect the HV battery pack 13 in response to detection of a threshold impact event of the types summarized above, indicative of the mobile system 10 having collided with or been impacted by another object. Disconnection of the HV battery pack 13 occurs automatically under such conditions via one or more pyrotechnic switches 40 and operation of an electronic monitoring unit 30 under normal conditions. Additionally, the battery electric system 12 incorporates an emergency disconnect circuit 14 having a manual disconnect circuit 42 to facilitate actions of first or second responders, salvage operations, and the like.

In the exemplary configuration of FIG. 1, the mobile system 10 is embodied as a motor vehicle, with the motor vehicle referred to hereinafter as the motor vehicle 10 for illustrative consistency and clarity. The motor vehicle 10 includes an interior 11, as well as a vehicle body 100 and road wheels 18 connected thereto. In some embodiments the vehicle body 100 includes a knock-out panel 100P, the function of which is described below with reference to FIG. 2. The battery electric system 12, in the non-limiting embodiment of FIG. 1, is operable for generating motor output torque (arrow $T_O$) via one or more electric traction motors ($M_E$) 16, and for delivering the motor output torque (arrow $T_O$) to a coupled load (L) 180. In the representative embodiment of FIG. 1, such a load 180 includes the road wheels 18 and one or more output members 160 rotatably connecting the load 180 to the electric traction motor(s) 16.

In a typical embodiment, the electric traction motor 16 shown schematically in FIG. 1 may be embodied as a polyphase/alternating current (AC) rotary electric machine. Accordingly, electrical power needed for energizing individual phase windings 17 of the electric traction motor 16 may be provided by a power inverter module (PIM) 19, which itself is electrically connected to the propulsion battery pack 13 via a high-voltage (HV) direct current (DC) bus 20 having positive (+) and negative (−) voltage rails. As appreciated in the art, operation of the PIM 19 occurs via internal semiconductor switching typically using, e.g., pulse width or pulse density modulation techniques. High-speed switching control of IGBTs or other suitably constructed semiconductor switches (not shown) housed within the PIM 19 inverts a DC voltage from the HV battery pack 13, in this instance operating as a propulsion battery pack, into a polyphase/AC voltage waveform suitable for energizing the phase windings 17 of the electric traction motor 16 when powering the road wheels 18.

Within the scope of the present disclosure, the battery electric system 12 of FIG. 1 includes additional electrical components, some of which are depicted in FIG. 1 and others of which are omitted for illustrative clarity. For example, an auxiliary power module (APM) 22 may be connected to the HV bus 20. The APM 22 is configured as a DC-to-DC voltage converter operable for receiving an input voltage from the HV bus 20 at a high-voltage level, e.g., 300-volts to 400-volts or more, and for outputting a lower auxiliary voltage of 12-volts in the illustrated embodiment. An auxiliary battery ($B_{AUX}$) 24, also referred to herein as a low-voltage (LV) power supply 24, is connected to the APM 22 via an LV bus 120, such that the APM 22 may be used to maintain a charge level of the auxiliary battery 24 as needed. When the auxiliary battery 24 is a 12-volt lead-acid battery in the exemplary embodiment of FIG. 1, the term "low-voltage" as used herein refers to nominal 12-volt levels, with "high-voltage" referring to voltage levels in excess of auxiliary levels, or nominally 300V or more in a possible implementation.

An electronic control unit (ECU) 50 may also be used as part of the battery electric system 12. The ECU 50, shown schematically in FIG. 1, may be embodied as one or more computers or computational nodes responsive to input signals (arrow $CC_1$), with at least some of the input signals (arrow $CC_1$) being measured dynamic or inertial forces on the motor vehicle 10, such as acceleration or deceleration, pitch, roll, and/or yaw rate, ground speed, etc.

The aforementioned EMU 30, which may be a resident component of the ECU 50 or integral with the pyrotechnic switch 40 in different embodiments, responds to forces exceeding a calibrated threshold by transmitting an electronic triggering signal (arrow $T_{40}$) to the pyrotechnic switch 40. As appreciated in the art, pyrotechnic switches, fuses, and other pyrotechnic devices of the types contemplated herein are configured to irreversibly fail when activated by an LV current or voltage signal, i.e., the electronic triggering signal (arrow $T_{40}$). Within the scope of the present disclosure, an electronic triggering signal (arrow $T_{40}^*$) is also selectively discharged to the pyrotechnic switch 40 by operation of the manual disconnect circuit 42. Activation of the pyrotechnic switch 40 creates an immediate open circuit condition on the HV bus 20, such as by severing one or more intervening transfer conductors, thereby effectively disconnecting the HV battery pack 13 from the HV bus 20. In other words, the pyrotechnic switch 40 is not a resettable switch, but rather is intended to be replaced after it has been ignited, exploded, or otherwise pyrotechnically triggered.

Certain programmed control functions of the ECU 50 lying outside of the scope of the present disclosure may include, e.g., propulsion mode control actions, thermal management of the battery electric system 12, battery charging/discharging control actions via a corresponding battery control signal (arrow $CC_{13}$), etc. Therefore, the input signals (arrow $CC_1$) in one or more embodiments may extend beyond the aforementioned force measurements used to inform the EMU 30. In order to perform these and other programmed functions, the ECU 50 includes application-specific amounts of the memory (M) 52 and one or more processor(s) (P) 54, e.g., microprocessors, central processing units, or application-specific integrated circuits (ASICs), as well as other associated hardware and software, for instance a digital clock or timer, input/output circuitry 56, buffer circuitry, etc. The memory 52 may include sufficient amounts of read only memory, for instance magnetic or optical memory. Signal transmission may occur in the various embodiments over physical transfer conductors such as copper wiring or wirelessly in different embodiments.

Referring to FIG. 2, the emergency disconnect circuit 14 enables selective manual disconnection of the HV battery pack 13 of FIG. 1 via the manual disconnect circuit 42. Such an option would benefit emergency roadside service efforts, such as by protecting first responders, second responders, or salvage crews from inadvertent contact with the HV bus 20 when the HV bus 20 remains energized. The manual disconnect circuit 42 functions separately from the ordinary automatic triggering of the pyrotechnic switch (PS) 40. That is, threshold force or impact events are detected by the EMU 30, using the suite of inertial sensors 130 such as speed sensor operable for measuring ground speed and one or more accelerometers operable for measuring pitch, yaw, and roll rates, lateral acceleration, attitude, etc. The EMU 30 responds by outputting the electronic triggering signal $T_{40}$ to the pyrotechnic switch 40 as a small current or voltage signal, as appreciated in the art. Although shown as being part of the ECU 50 of FIG. 1 for illustrative clarity, the EMU 30 may be optionally embodied as a microchip or microprocessor collocated or integral with the pyrotechnic switch 40 in a possible implementation. Arrival of the electronic triggering signal $T_{40}$ at the pyrotechnic switch 40 causes internal pyrotechnically-activated destruction, e.g., via miniature explosive charges as appreciated in the art. As a result, transfer conductors between the HV bus 20 and the HV battery pack 13 are quickly and irreversibly severed, thus causing the nearly instantaneous disconnection of the HV battery pack 13.

While inclusion of the pyrotechnic switch 40 within the emergency disconnect circuit 14 of FIG. 2 helps ensure automatic and rapid disconnection of the HV battery pack 13 as noted above, a given impact event may not be of sufficient magnitude for triggering the pyrotechnic switch 40. Alternatively, the detected impact event could lead to the triggering of the pyrotechnic switch 40 and resulting disconnection of the HV battery pack 13. Without further testing, however, a responder might be unable to quickly discern whether or not the pyrotechnic switch 40 and EMU 30 functioned as expected, and that the HV battery pack 13 no longer remains connected to the HV bus 20. The manual disconnect circuit 42 of FIG. 2 thus provides another reliable way for ensuring that the pyrotechnic switch 40 has indeed triggered in the expected manner.

To that end, the manual disconnect circuit 42 may include a switch housing 420 within which is positioned a manual switch 45. The switch housing 420 in some implementations may be an aluminum, plastic, or other lightweight weatherproof container, with external electrical connections to the auxiliary battery 24 and the pyrotechnic switch 40 provided via a corresponding electrical connector 60A and 60B. Although shown schematically for illustrative simplicity in FIG. 2, the manual switch 45 in an actual implementation may be embodied as a two-stage switch, e.g., a pull-and-push or a pull-and-twist mechanism. Such a configuration would help minimize opportunities for inadvertent closing of the manual switch 45, e.g., during routine maintenance operations. In a similar manner, the optional knock-out panel 100P of FIG. 1 could be used to hide the manual switch 45 from everyday view, and to thus prevent inadvertent access.

In an exemplary use scenario, a first responder may arrive at the scene of an event in which the first responder wishes to ensure with a high level of confidence that the HV battery pack 13 has been disconnected from the HV bus 20. To ensure this result, the first responder may locate the manual switch 45, e.g., by removing the optional knock-out panel 100P. The first responder may then close the manual switch 45. As will be appreciated, when the manual switch 45 is in an open position, i.e., the particular position depicted in FIG. 2, the manual switch 45 forms an open circuit between the auxiliary battery 24 and the pyrotechnic switch 40, and thus the pyrotechnic switch 40 is activatable solely by normal operation of the EMU 30.

However, closing of the manual switch 45 connects the auxiliary battery 24 to the pyrotechnic switch 40, thereby discharging the electronic triggering signal $T_{40}*$ to the pyrotechnic switch 40. This action in turn causes the pyrotechnic switch 40 to immediately fail, thereby disconnecting the HV battery pack 13 of FIG. 1 from the HV bus 20 in the same manner as the electronic triggering signal $T_{40}$ from the EMU 30. In the event a detected force event resulted in prior activation of the pyrotechnic switch 40, such as by malfunctioning of the EMU 30, the subsequent use of the manual switch 45 will have no effect. The electronic triggering signal $T_{40}*$ will simply see an open circuit in this case. In the unlikely event the pyrotechnic switch 40 should fail to activate in response to the electronic triggering signal $T_{40}$ from the EMU 30, the subsequent use of the manual switch 45 will trigger the pyrotechnic switch 40, thus resulting in the rapid disconnection of the HV battery pack 13.

Still referring to FIG. 2, a diode D1 may be disposed between the auxiliary battery 24 or other main auxiliary power supply and the manual switch 45. The diode D1 may be biased to prevent an inadvertent flow of electrical current back to the auxiliary battery 24. At the same time, a capacitor C1 may be positioned in parallel with the auxiliary battery 24 to allow for temporary storage of a capacitor voltage $V_C$. Should the auxiliary battery 24 somehow become disconnected or inoperable during the above-noted impact event, the capacitor voltage $V_C$ will remain available for a short time. Actuation of the manual switch 45 in such a case, i.e., when the capacitor voltage $V_C$ is available, would therefore still result in activation of the pyrotechnic switch 40, in this instance due to discharge of the electronic triggering signal $T_{40}*$ to the pyrotechnic switch 40.

In a possible configuration, the switch housing 42O may be equipped with another electrical connector 60C. In the event a responder should discover that the auxiliary battery 24 is depleted or has been rendered inoperable, and that the capacitor C1 is likewise depleted or damaged, the existence of the electrical connector 60C allows the responder to quickly connect an external battery ($B_{EXT}$) 124 to the manual disconnect circuit 42. Once the external battery 124 has been connected via the electrical connector 60C, e.g., a simple plug-in terminal-to-terminal connection, the manual switch 45 may be closed in the above-described manner to trigger the pyrotechnic switch 40. In this instance, the electronic triggering signal $T_{40}*$ is discharged by the external battery 124 to the pyrotechnic switch 40 via another electrical connector 60D. The external battery 124 is thus operable for discharging the electronic triggering signal $T_{40}*$ to the pyrotechnic switch 40 when the manual switch 45 is transitioned to the closed position.

In a possible implementation, the emergency disconnect circuit 14 of FIG. 2 may be equipped with a light-emitting diode (LED) D2. The optional LED D2 is connected to the LV bus 120 in parallel with and downstream of the manual switch 45. In such a position, the electronic triggering signal $T_{40}*$ passing through the LED D2 would cause the LED D2 to illuminate, such that the LED D2 is operable for indicating whether the manual switch 45 is in the closed position with power flowing therethrough. The LED D2 may be positioned adjacent to the manual switch 45 or at another readily viewable location. Such a parallel connection would be advantageous relative to a series connection, as the latter would not light up in the event the pyrotechnical switch has already deployed or activated, and has thus formed an open circuit.

Realization of the various benefits of the present teachings would be facilitated by strategic placement of the emergency disconnect circuit 14 at a readily accessible location aboard the motor vehicle 10 of FIG. 1. Depending on the construction of the motor vehicle 10, for instance, the emergency disconnect circuit 14, and in particular the switch housing 42O, may be positioned behind the knock-out panel 100P on the vehicle body 100 of FIG. 1 as noted above. Such a knock-out panel 100P may be part of an external surface of the vehicle body 100, e.g., under the hood or trunk lid, or in another suitable location. In this manner, an arriving responder team may carefully remove the knock-out panel 100P to expose the manual switch 45, close the manual switch 45 according to its predetermined closing sequence, and thereafter commence with assisting passengers seated within the interior 11 and/or performing rescue or salvage operations on the motor vehicle 10.

As will be appreciated by those skilled in the art in view of this disclosure, the solutions set forth above offer enhanced protection from HV hazards after events in which the pyrotechnic switch 40 would ordinarily be expected to activate, as well as in cases in which it would be desirable to ensure disconnection of the HV battery pack 13 of FIG. 1 from the HV bus 20. Although first responders such as police, fire, and rescue personnel, paramedics, and the like stand to directly benefit from implementation of the present teachings, second responders such as tow truck operators, repair personnel, and disposal personnel would likewise benefit from the provided emergency disconnect circuit 14. Additionally, the ability to connect various power supplies to the pyrotechnic switch 40 via the intervening manual disconnect circuit 42 ensures a more reliable solution in the event the auxiliary battery 24 is depleted, disconnected, or otherwise unavailable. These and other attendant benefits will be readily appreciated by those skilled in the art in view of the foregoing disclosure.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims. Moreover, this disclosure expressly includes combinations and sub-combinations of the elements and features presented above and below.

What is claimed is:

1. An emergency disconnect circuit for a battery electric system having a high-voltage (HV) bus, a low-voltage (LV) bus, an HV battery pack connected to the HV bus, and a LV power supply, connected to the LV bus, the emergency disconnect circuit comprising:
- a pyrotechnic switch configured to activate in response to an electronic triggering signal to thereby disconnect the HV battery pack from the HV bus; and
- a manual switch arranged on the LV bus in series with and between the pyrotechnic switch and the LV power supply, wherein a transition of the manual switch from an open position to a closed position connects the LV power supply to the pyrotechnic switch, and thereby causes the LV power supply to discharge the electronic triggering signal to the pyrotechnic switch.

2. The emergency disconnect circuit of claim 1, wherein the LV power supply includes a 12-volt auxiliary battery, further comprising a diode disposed between the 12-volt auxiliary battery and the manual switch.

3. The emergency disconnect circuit of claim 2, wherein the HV battery pack is a propulsion battery pack of a mobile system.

4. The emergency disconnect circuit of claim 3, wherein the emergency disconnect circuit includes an electronic monitoring unit (EMU) operable for detecting a threshold impact event of the mobile system, and for transmitting the electronic triggering signal to the pyrotechnic switch in response to detecting the threshold impact event.

5. The emergency disconnect circuit of claim 3, further comprising a capacitor positioned in parallel with the 12-volt auxiliary battery, wherein the capacitor is operable for discharging the electronic triggering signal to the pyrotechnic switch when the manual switch is in the closed position.

6. The emergency disconnect circuit of claim 1, wherein the emergency disconnect circuit is configured to connect to an external battery, such that the external battery is configured to discharge the electronic triggering signal to the pyrotechnic switch when the manual switch is in the closed position.

7. A battery electric system for use aboard a mobile system, comprising:
- a low-voltage (LV) power supply;
- a high-voltage (HV) bus;
- a high-voltage (HV) battery pack connected to the HV bus, including a pyrotechnic switch configured to activate in response to an electronic triggering signal to thereby disconnect the HV battery pack from the HV bus;
- an emergency disconnect circuit connected to the pyrotechnic switch, including a manual switch connected in series with and between the pyrotechnic switch and the LV power supply, and configured, when transitioned from an open position to a closed position, to discharge the electronic triggering signal to the pyrotechnic switch; and
- an electronic monitoring unit operable for transmitting the electronic triggering signal to the pyrotechnic switch in response to detecting a threshold impact event of the mobile system, wherein the pyrotechnic switch is configured to activate in response to the electronic triggering signal to thereby disconnect the HV battery pack from the HV bus.

8. The battery electric system of claim 7, wherein the mobile system includes an electric propulsion motor connected to the HV battery pack and the HV battery pack is configured as a propulsion battery pack.

9. The battery electric system of claim 7, wherein the emergency disconnect circuit includes a diode disposed between and in series with the LV power supply and the manual switch.

10. The battery electric system of claim 7, wherein the emergency disconnect circuit includes a capacitor positioned in parallel with the LV power supply, and wherein the capacitor is operable for discharging the electronic triggering signal to the pyrotechnic switch when the manual switch is transitioned to the closed position.

11. The battery electric system of claim 7, wherein the emergency disconnect circuit is configured to connect to an external battery, and the external battery is operable for discharging the electronic triggering signal to the pyrotechnic switch when the manual switch is transitioned to the closed position.

12. The battery electric system of claim 7, wherein the electronic monitoring unit is integral with the pyrotechnic switch.

13. The battery electric system of claim 7, wherein the HV battery pack includes one or more lithium-ion battery packs, and wherein the LV power supply includes a 12-volt lead acid battery.

14. A motor vehicle comprising:
- a vehicle body;
- a 12-volt battery positioned on a low-voltage (LV) bus;
- a high-voltage (HV) propulsion battery pack positioned on an HV bus, and having a pyrotechnic switch configured to activate in response to an electronic triggering signal and thereby disconnect the HV battery pack from the HV bus;
- an emergency disconnect circuit connected to the pyrotechnic switch, including a manual switch situated on the LV bus in series with and between the pyrotechnic switch and the 12-volt battery, wherein the manual switch, when transitioned from an open position to a closed position, connects the 12-volt battery to the pyrotechnic switch and thereby causes the 12-volt battery to discharge the electronic triggering signal to the pyrotechnic switch; and
- an electronic monitoring unit (EMU) operable for generating the electronic triggering signal in response to a threshold impact event of the motor vehicle, wherein the EMU includes a suite of inertial sensors configured to detect a threshold impact event of the vehicle body, and to transmit the electronic triggering signal to the pyrotechnic switch in response to the threshold impact event.

15. The motor vehicle of claim 14, further comprising an electric propulsion motor connected to the HV battery pack, and wherein the HV battery pack is configured as a propulsion battery pack.

16. The motor vehicle of claim 15, wherein the propulsion battery pack includes one or more lithium-ion battery packs.

17. The motor vehicle of claim 15, wherein the electric propulsion motor is a polyphase motor connected to the propulsion battery pack via a power inverter.

18. The motor vehicle of claim 14, wherein the emergency disconnect circuit includes a diode disposed between and in series with and between the 12-volt battery and the manual switch, and a capacitor positioned in parallel with the 12-volt battery, the capacitor being operable for discharging the electronic triggering signal to the pyrotechnic switch when the manual switch is transitioned to the closed position.

19. The motor vehicle of claim 14, wherein the emergency disconnect circuit is configured to connect to an external battery, and wherein the external battery is operable for discharging the electronic triggering signal to the pyrotechnic switch when the manual switch is transitioned to the closed position.

20. The motor vehicle of claim 14, wherein the emergency disconnect circuit includes a light-emitting diode (LED) connected to the LV bus downstream of the manual switch, and operable for indicating whether the manual switch is in the closed position with power flowing therethrough.

* * * * *